US012596226B2

(12) United States Patent
Sidorov et al.

(10) Patent No.: US 12,596,226 B2
(45) Date of Patent: Apr. 7, 2026

(54) MONOLITHICALLY INTEGRATED OPTICAL ASSEMBLY

(71) Applicant: ams-OSRAM AG, Premstaetten (AT)

(72) Inventors: Victor Sidorov, Graz (AT); Anderson Singulani, Graz (AT)

(73) Assignee: ams-OSRAM AG, Premstaetten (AT)

( * ) Notice: Subject to any disclaimer, the term of this patent is extended or adjusted under 35 U.S.C. 154(b) by 331 days.

(21) Appl. No.: 18/548,223

(22) PCT Filed: Mar. 23, 2022

(86) PCT No.: PCT/EP2022/057630
§ 371 (c)(1),
(2) Date: Aug. 29, 2023

(87) PCT Pub. No.: WO2022/200428
PCT Pub. Date: Sep. 29, 2022

(65) Prior Publication Data
US 2024/0176082 A1 May 30, 2024

(30) Foreign Application Priority Data
Mar. 25, 2021 (GB) .................................... 2104223

(51) Int. Cl.
*G02B 6/12* (2006.01)
*G02B 6/124* (2006.01)
(Continued)

(52) U.S. Cl.
CPC ..... *G02B 6/12002* (2013.01); *G02B 6/12004* (2013.01); *G02B 6/124* (2013.01); *G02B 6/34* (2013.01); *G02B 6/4214* (2013.01)

(58) Field of Classification Search
CPC .... G02B 6/34; G02B 6/4214; G02B 6/12002; G02B 6/12004; G02B 6/124
See application file for complete search history.

(56) References Cited

U.S. PATENT DOCUMENTS 5,070,488 A 12/1991 Fukushima et al.
7,627,018 B1 12/2009 Guilfoyle et al.
(Continued)

FOREIGN PATENT DOCUMENTS

CN 112180502 A 1/2021
CN 212749307 U 3/2021
(Continued)

OTHER PUBLICATIONS

International Search Report for the corresponding International Application No. PCT/EP2022/057630, dated Jul. 19, 2022, 4 pages (for informational purposes only).
(Continued)

*Primary Examiner* — Michael P Mooney
(74) *Attorney, Agent, or Firm* — Viering, Jentschura & Partner mbB

(57) ABSTRACT

A monolithically integrated optical assembly comprising a waveguide configured to receive light and a coupling element configured to couple light into the waveguide. The monolithically integrated optical assembly comprises an optical element comprising a pattern of features configured to control a propagation of light incident on the coupling element.

20 Claims, 7 Drawing Sheets

100

(51) Int. Cl.
    *G02B 6/34*        (2006.01)
    *G02B 6/42*        (2006.01)

(56)             References Cited

U.S. PATENT DOCUMENTS

| | | | |
|---|---|---|---|
| 9,235,097 B2 | 1/2016 | Meade et al. | |
| 10,481,328 B1 * | 11/2019 | Krueger | G02B 6/1221 |
| 2019/0179082 A1 * | 6/2019 | Grehn | G02B 6/4204 |
| 2019/0207368 A1 * | 7/2019 | Meister | H01S 5/02251 |
| 2020/0049886 A1 * | 2/2020 | Chriqui | G02F 1/31 |
| 2020/0348466 A1 | 11/2020 | Lopez et al. | |

FOREIGN PATENT DOCUMENTS

| | | | |
|---|---|---|---|
| WO | 2019217466 A1 | 11/2019 | |
| WO | 2020110789 A1 | 6/2020 | |

OTHER PUBLICATIONS

Search Report for the corresponding British Patent Application No. 2104223.9, dated Aug. 23, 2021, 7 pages (for informational purposes only).

* cited by examiner

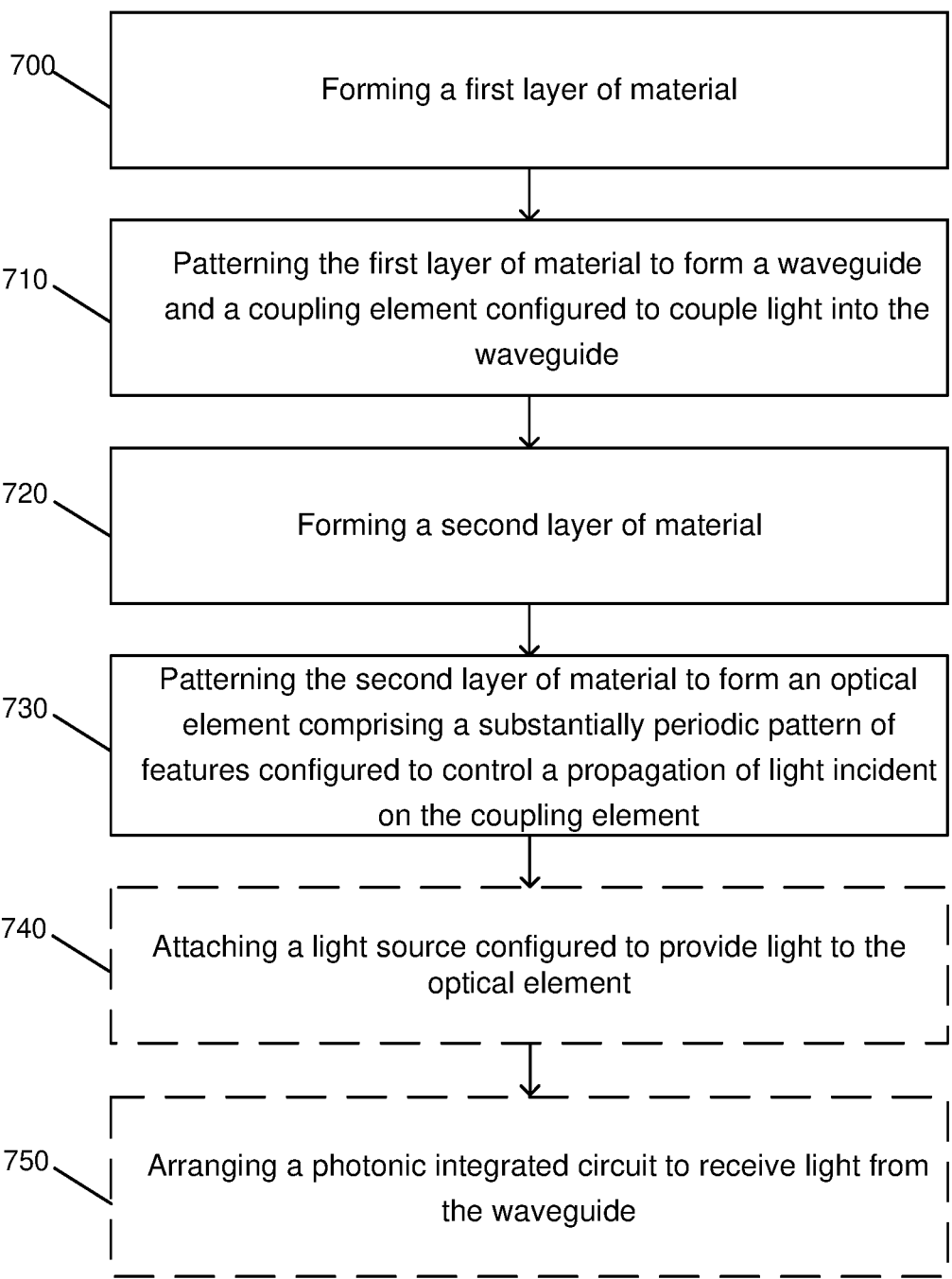

700 — Forming a first layer of material

710 — Patterning the first layer of material to form a waveguide and a coupling element configured to couple light into the waveguide 720 — Forming a second layer of material 730 — Patterning the second layer of material to form an optical element comprising a substantially periodic pattern of features configured to control a propagation of light incident on the coupling element 740 — Attaching a light source configured to provide light to the optical element 750 — Arranging a photonic integrated circuit to receive light from the waveguide

FIG. 7

MONOLITHICALLY INTEGRATED OPTICAL ASSEMBLY

CROSS-REFERENCE TO RELATED APPLICATIONS

This application is a U.S. National Stage Application, filed under 35 U.S.C. § 371, of International Application No. PCT/EP2022/057630, filed on Mar. 23, 2022, and claims priority under 35 U.S.C. § 119(a) and 35 U.S.C. § 365(b) from GB Patent Application No. 2104223.9, filed on Mar. 25, 2021; the disclosures of which are incorporated herein by reference.

TECHNICAL FIELD OF THE DISCLOSURE

The disclosure relates to a monolithically integrated optical assembly, particularly but not exclusively to a monolithically integrated optical coupling assembly, and a method of manufacturing such a monolithically integrated optical assembly. The monolithically integrated optical assembly may form part of a photonic integrated circuit. The monolithically integrated optical assembly may be suitable for optically coupling light from a light source to a grating coupler of a waveguide on a silicon-based photonic integrated circuit. The monolithically integrated optical assembly may form part of an electronic device such as, for example, a sensor.

BACKGROUND OF THE DISCLOSURE

The present disclosure relates to a monolithically integrated optical assembly.

An example of a known optical system 100 is illustrated in FIG. 1. It is known to form a metalens 110 on a quartz substrate (not shown). It is known to attach the metalens 110 to a vertical-cavity surface-emitting laser (VCSEL) 120. It is known to form a monolithically integrated optical assembly 130 comprising a waveguide 140 and a grating coupler 150 configured to couple light 160 into the waveguide 140. It is known to solder (e.g. using solder balls 170) the VCSEL 120 and metalens 110 assembly to the monolithically integrated optical assembly 130. The resulting product is a known optical system 100 comprising three separately formed components (i.e. the metalens 110, the VCSEL 120 and the monolithically integrated optical assembly 130) that are subsequently attached to each other (e.g. using adhesive and/or soldering). The known optical system 100 acts to couple light generated by the VCSEL 120 into the waveguide 140.

Some problems associated with such known optical systems 100 are that some light 160 does not couple into the waveguide 140, which limits an optical coupling efficiency of the known optical system 100. Some light 180 reflects from the monolithically integrated optical assembly 130 and travels back towards other components such as the VCSEL 120 and the solder balls 170. Reflected light 180 can damage the VCSEL 120. Reflected light 180 can cause unwanted heating of components, which may lead to structural wear of the known optical system 100. Fabrication of the known optical system 100 comprises multiple separate steps and is an expensive and time-consuming process. Fabrication of the metalens 110 on the quartz substrate involves complex, expensive and time-consuming processes such as electron beam lithography and inductively coupled plasma etching.

U.S. Pat. No. 7,627,018 discloses a monolithically integrated optical assembly comprising a waveguide configured to receive light, a coupling grating configured to couple light into the waveguide and a controlling grating configured to diffract TM-polarized light and thereby introduce a loss difference between a TE polarization mode and a TM polarization mode within the optical assembly. The loss difference introduced by the controlling grating causes TE-polarized light to lase, for example, within the optical assembly, which improves a coupling efficiency of TE-polarized light into the waveguide. The controlling grating comprises a periodic pattern of parallel bars configured to cause diffractive losses of TM-polarized light within the optical assembly. That is, the controlling grating is polarization sensitive and does not effect a propagation of the TE polarization mode that is incident on the coupling grating.

U.S. Pat. No. 9,235,097 discloses an optical assembly configured to actively align light from an optical fiber to a photonic integrated circuit. The optical assembly comprises a liquid crystal steering device configured to control a polarization of incident light to steer the light into one of three diffraction orders and thereby adjust a propagation direction of the light. The liquid crystal steering device is a separately manufactured component that is subsequently bonded between an index-matching layer and the waveguide using an adhesive such as double-sided tape. The liquid crystal steering device is a complex system comprising polarizing wave plates and electrodes. The liquid crystal steering device requires active control of a voltage supply to steer incident light. The liquid crystal material in the liquid crystal steering device is sensitive to changes in temperature and may not be suitable for use with higher power sources of radiation, such as a VCSEL.

It is therefore an aim of the present disclosure to provide a monolithically integrated optical assembly, and a method of manufacturing said monolithically integrated optical assembly, that addresses one or more of the problems above or at least provides a useful alternative.

SUMMARY

Aspects of the present disclosure provide an improved concept of a monolithically integrated optical assembly, and method of manufacture thereof. The monolithically integrated optical assembly may form part of a solid-state optical device, such as a light source chip and/or a photonic integrated circuit. The monolithically integrate optical assembly may be suitable for coupling light into a photonic integrated circuit.

According to one aspect of the present disclosure, there is provided a monolithically integrated optical assembly comprising a waveguide configured to receive light, a coupling element configured to couple light into the waveguide, and an optical element comprising a pattern of features configured to control a propagation of light incident on the coupling element.

The monolithically integrated optical assembly of the present disclosure differs from the known optical system 100 at least in that the optical element comprising the pattern of features is a monolithically integrated part of the optical assembly along with the waveguide and the coupling element. That is, the optical element comprising the pattern of features is not a separate component (e.g. the metalens of the known optical system 100) and is not attached to the optical assembly as part of a separate component (e.g. the VCSEL of the known optical system 100). This has the technical effect of improving an optical coupling efficiency into the waveguide by controlling a propagation of light incident on the coupling element (e.g. through angle of incidence control and/or focus control). The monolithically integrated optical assembly of the present disclosure requires fewer separate manufacturing processes to fabricate, making it cheaper and less time-consuming to produce compared to the known optical system 100. The monolithically integrated optical assembly of the present disclosure may be formed using CMOS compatible manufacturing processes, such as imprint lithography or photolithography. The monolithically integrated optical assembly of the present disclosure may be formed using CMOS compatible materials, such as silicon substrates. CMOS compatible materials and processes are more widely available and allow higher volume manufacturing than the materials and processes used to manufacture the known optical system 100.

The monolithically integrated optical assembly of the present disclosure differs from the optical assembly of U.S. Pat. No. 7,627,018 at least in that the optical element comprising the pattern of features is configured to control a propagation of light incident on the coupling element. In contrast, the controlling grating of U.S. Pat. No. 7,627,018 is configured to cause a loss of TM-polarized light within the optical assembly. Controlling the propagation of light incident on the coupling element has the advantageous technical effect of increasing the amount of light that couples into the waveguide (e.g. through angle of incidence control and/or focus control) whilst avoiding the loss of one or more polarizations of light within the optical assembly. That is, an optical efficiency of the monolithically integrated optical assembly of the present disclosure is greatly improved.

The monolithically integrated optical assembly of the present disclosure differs from the optical assembly of U.S. Pat. No. 9,235,097 at least in that the optical element is a monolithically integrated part of the optical assembly along with the waveguide and the coupling element. That is, the optical element comprising the pattern of features is not a separate component (e.g. the liquid crystal steering device of U.S. Pat. No. 9,235,097) and is not subsequently attached to the optical assembly (e.g. using double-sided tape as per U.S. Pat. No. 9,235,097). The monolithically integrated optical assembly of the present disclosure also differs from the optical assembly of U.S. Pat. No. 9,235,097 at least in that the optical element comprises a pattern of features configured to control a propagation of light incident on the coupling element. These differences have the technical effect of increasing the amount of light that couples into the waveguide, thereby improving an optical efficiency of the monolithically integrated optical assembly. The monolithically integrated optical assembly of the present disclosure requires fewer separate manufacturing processes to fabricate, making it cheaper and less time-consuming to produce compared to the optical assembly of U.S. Pat. No. 9,235,097. The monolithically integrated optical assembly of the present disclosure may be formed using CMOS compatible manufacturing processes, such as imprint lithography or photolithography. The monolithically integrated optical assembly of the present disclosure may be formed using CMOS compatible materials, such as silicon substrates. CMOS compatible materials and processes are more widely available and allow higher volume manufacturing than the materials and processes used to manufacture the optical assembly of U.S. Pat. No. 9,235,097.

According to aspects of the present disclosure, components of the monolithically integrated optical assembly are monolithically integrated together in a single integrated block or chip. In particular, the manufacturing of the monolithically integrated optical assembly may not rely on any soldering, adhesives or alternative ways of connecting separately formed components. The entire monolithically integrated optical assembly may be manufactured in a single process without the need for interconnecting different portions via soldering. This advantageously avoids downsides such as optical losses due to misaligned optical elements.

The waveguide may be substantially planar.

The waveguide may comprise a material that is substantially transparent to the wavelength of light that is to be coupled into the waveguide. The waveguide may comprise, for example, silicon. The waveguide may comprise, for example, silicon nitrate.

The coupling element may be substantially planar.

The coupling element may comprise a grating coupler.

The coupling element may comprise a material that is substantially transparent to the wavelength of light that is to be coupled into the waveguide. The coupling element may comprise, for example, silicon. The coupling element may comprise, for example, silicon nitrate.

The optical element may be substantially planar.

The optical element may comprise amorphous silicon.

The optical element may be polarization insensitive.

The pattern of features may comprise a substantially periodic pattern of features. The substantially periodic pattern of features may have a periodicity that varies by less than about 30%. The substantially periodic pattern of features may have a periodicity that varies by less than about 10%. A substantially periodic pattern of features may be referred to as a periodic pattern of features.

The pattern of features may comprise an aperiodic ordered pattern of features. The aperiodic ordered pattern of features may be a non-periodic pattern having one or more symmetries. The aperiodic ordered pattern of features may not show any translational symmetry.

The optical element may be configured to control an angle at which light is incident on the coupling element. This advantageously allows improvement of a coupling efficiency of the optical assembly.

The optical element may be configured to direct light toward the coupling element at an oblique angle of incidence. This advantageously allows further improvement of a coupling efficiency of the optical assembly.

The optical element may be configured to adjust the angle at which light is incident on the coupling element to about 5° or more. The optical element may be configured to adjust the angle at which light is incident on the coupling element to about 10° or less. The optical element may be configured to adjust the angle at which light is incident on the coupling element to about 8°.

The geometry of the pattern of features may be selected in at least partial dependence on a wavelength of the light that is to be coupled into the waveguide and/or a geometry of the coupling element. The dimensions of the features and/or a periodicity of the pattern of features may be smaller than a wavelength of light that is to be controlled by the optical element.

The optical element may be configured to control a propagation of (e.g. transmit and/or reflect in a controlled manner) infrared light. Infrared light may include light having a wavelength of about 800 nm or more. The optical element may be configured to control light having a wavelength of about 840 nm. The optical element may be configured to control light having a wavelength of about 940 nm. The optical element may be configured to control light having a wavelength of about 1300 nm. The features may have dimensions of about 50 nm or more. The features may have dimensions of about 700 nm or less. The features may have dimensions of about 500 nm or less. The periodicity of the pattern of features may be about 900 nm or less. The periodicity of the pattern of features may be about 800 nm or less. The periodicity of the pattern of features may be about 200 nm or more. These dimensions and periodicities may be suitable for controlling a propagation of infrared radiation.

The optical element may be configured to control a focus of light incident on the coupling element. This advantageously allows further improvement of a coupling efficiency of the optical assembly.

The optical element may be configured to control an angle at which light reflects from the optical element. This advantageously allows control of reflected light to reduce or avoid negative effects resulting from uncontrolled reflected light (e.g. overheating problems and/or damage caused to the optical assembly and/or other devices used in connection with the optical assembly). For example, the optical element may be configured to reflect at least some light away from an aperture of a light source that provides light to the optical assembly to avoid damaging the light source.

The monolithically integrated optical assembly may further comprise a cladding structure. The cladding structure may be configured to envelop the coupling element and the waveguide. The optical element may be located on the cladding structure or in the cladding structure. This advantageously provides a compact and mechanically robust optical assembly.

The cladding structure may comprise silicon dioxide.

The cladding structure may be formed on a silicon substrate.

The pattern of features may comprise an array of geometric features.

The array of geometric features may comprise a grid array.

The geometric features may comprise nano-columns.

The array of geometric features may comprise a column grid array.

The array of geometric features may comprise a nano-columnar structure.

The array of geometric features may comprise periodicity along two substantially orthogonal axes within a plane of the optical element.

The array of geometric features may comprise a crossed grating or crisscross pattern.

The array of geometric features may comprise a first row comprising a plurality of geometric features and a second row comprising a plurality of geometric features.

The pattern of features may be made from a material on a substrate using an additive process and/or complementary features may be made using a reductive process (i.e. by removing material). The pattern of features could be fabricated either way (i.e. additive and/or reductive processes).

The pattern of features may comprise sub-wavelength patterns and/or features.

The array of geometric features may be polarization insensitive.

The optical element may comprise a metamaterial. The metamaterial may comprise a metalens.

The optical element may comprise a metasurface. The metasurface may comprise a substantially planar metalens.

According to one aspect of the present disclosure, there is provided an optical system comprising the monolithically integrated optical assembly of an aspect of the present disclosure and a photonic integrated circuit configured to receive light from the waveguide of the monolithically integrated optical assembly.

The optical element may comprise a metasurface formed on a surface of the photonic integrated circuit.

According to one aspect of the present disclosure, there is provided an optical system comprising the monolithically integrated optical assembly of an aspect of the present disclosure and a light source configured to provide light to the monolithically integrated optical assembly.

The light source may be a VCSEL. The light source be an LED. The light source may be an edge-emitting laser (EEL).

The optical element may be configured to reflect at least some light away from the light source.

According to one aspect of the present disclosure, there is provided an electronic device comprising the monolithically integrated optical assembly of an aspect of the present disclosure or the optical system of an aspect of the present disclosure.

According to one aspect of the present disclosure, there is provided a method of manufacturing a monolithically integrated optical assembly comprising forming a first layer of material and patterning the first layer of material to form a waveguide and a coupling element configured to couple light into the waveguide. The method comprises forming a second layer of material and patterning the second layer of material to form an optical element comprising a pattern of features configured to control a propagation of light incident on the coupling element.

Forming the first layer of material may comprise depositing the first layer of material on a substrate.

Forming the first layer of material may comprise thin film deposition of the first layer of material on the substrate.

Forming the first layer of material may comprise chemical vapour deposition of the first layer of material on the substrate.

The substrate may be a silicon substrate.

The first layer of material may comprise silicon nitrate.

Patterning the first layer of material may comprise using imprint lithography.

Patterning the first layer of material may comprise using photolithography.

Patterning the first layer of material may comprise etching the first layer of material.

The method may comprise forming a lower cladding layer on a substrate. For example, the method may comprise depositing (e.g. using thin film deposition or chemical vapour deposition) a layer of silicon dioxide on a silicon substrate.

The method may comprise forming the first layer of material on the lower cladding layer.

The method may comprise forming an upper cladding layer on the coupling element and waveguide. For example, the method may comprise depositing (e.g. using thin film deposition or chemical vapour deposition) a layer of silicon dioxide on a layer of silicon nitrate that forms the coupling element and the waveguide.

The method may comprise levelling the upper cladding layer to form a cladding structure configured to envelop the coupling element and the waveguide.

The method may comprise polishing (e.g. chemically polishing) a layer of silicon dioxide that forms the upper cladding layer to form a substantially flat upper surface of the cladding structure.

The method may comprise forming a second layer of material on the upper surface of the cladding structure. For example, the method may comprise depositing (e.g. using thin film deposition or chemical vapour deposition) a layer of amorphous silicon on the upper surface of the cladding structure.

The method may be a fully CMOS compatible process. The method may be compatible with the temperatures, e.g., up to 400° C., of a CMOS process.

Forming the second layer of material may comprise depositing the second layer of material.

Depositing the second layer of material may comprise using thin film deposition.

Depositing the second layer of material may comprise using chemical vapour deposition.

Patterning the second layer of material may comprise using imprint lithography or photolithography to form the pattern of features. These techniques are faster than e-beam lithography e.g. the entire pattern may be illuminated or imprinted at one time compared to sequentially writing each feature in the pattern.

The method may comprise using nano-imprint lithography to form the pattern of features.

The method may comprise using extreme ultraviolet photolithography to form the pattern of features.

The method may comprise overcoating the optical element.

According to one aspect of the present disclosure, there is provided a method of manufacturing an optical system comprising arranging a photonic integrated circuit to receive light from the waveguide of the monolithically integrated optical assembly of an aspect of the present disclosure.

According to one aspect of the present disclosure, there is provided a method of manufacturing an optical system comprising attaching a light source to the monolithically integrated optical assembly of an aspect of the present disclosure.

BRIEF DESCRIPTION OF THE DRAWINGS

The following description of figures of exemplary embodiments may further illustrate and explain aspects of the improved concept. Components and parts of the monolithically integrated optical assembly with the same structure and the same effect appear with equivalent reference symbols. Insofar as components and parts of the monolithically integrated optical assembly correspond to one another in terms of their function in different figures, the description thereof is not repeated for each of the following figures.

Some embodiments of the disclosure will now be described by way of example only and with reference to the accompanying drawings, in which:

FIG. 7 is a flowchart of a method of manufacturing a monolithically integrated optical assembly, and optionally an optical system, in accordance with the present disclosure.

DETAILED DESCRIPTION

Figure 1:
FIG. 1 schematically depicts a cross-sectional view from the side of a known optical system.
Figure 1:
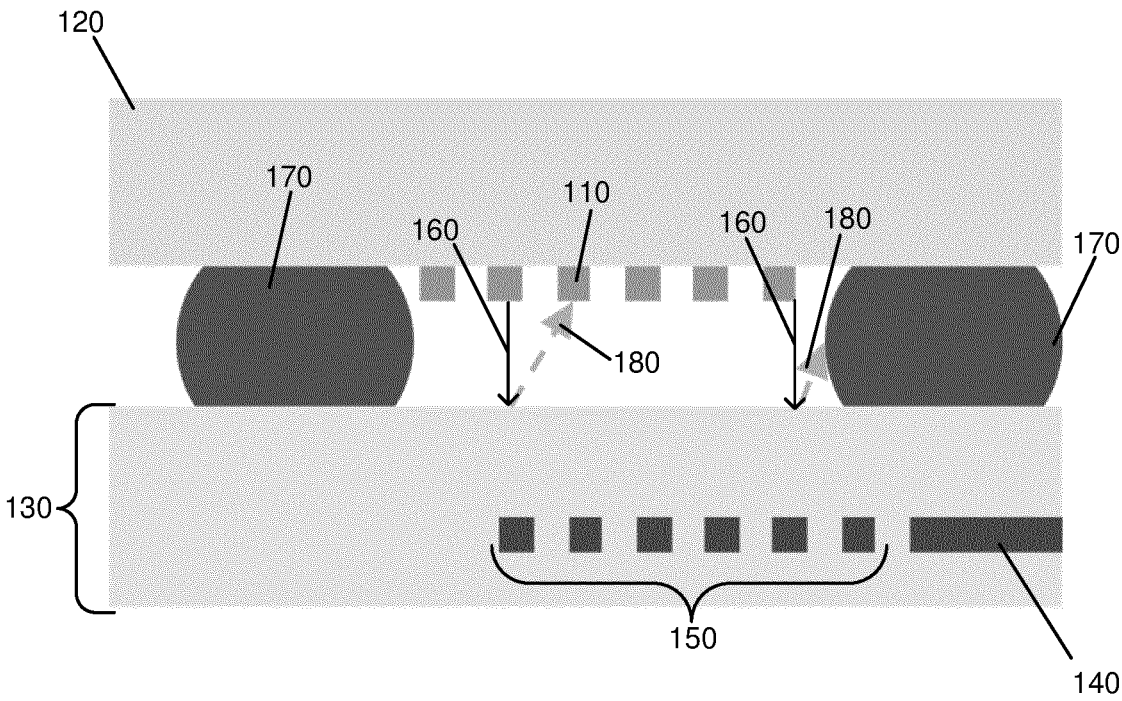
Figure 2A:
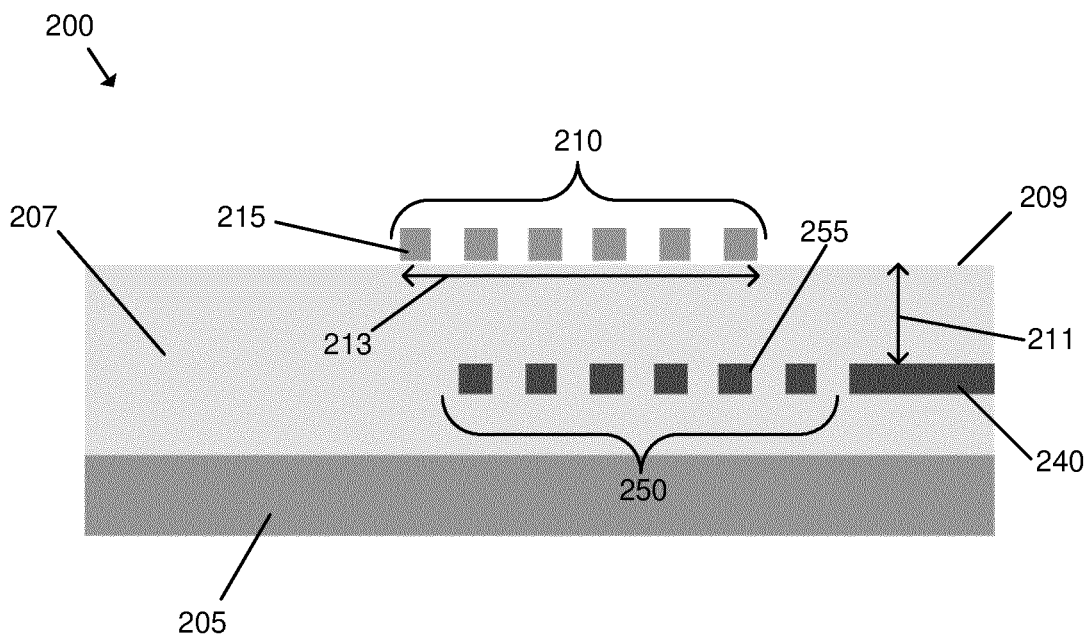
FIG. 2A schematically depicts a cross-sectional view from the side of a monolithically integrated optical assembly comprising an optical element in accordance with the present disclosure.

FIG. 2A schematically depicts a cross-sectional side view of a monolithically integrated optical assembly 200 in accordance with the present disclosure. The monolithically integrated optical assembly 200 comprises a waveguide 240 configured to receive light. In the example of FIG. 2A, the waveguide 240 is substantially planar. The waveguide 240 may comprise silicon. The waveguide 240 may be formed from, for example, silicon nitrate. The waveguide 240 may be configured to provide light to an optical device (not shown), such as a photonic integrated circuit. The monolithically integrated optical assembly 200 comprises a coupling element 250 configured to couple light into the waveguide 240. In the example of FIG. 2A, the coupling element 250 is substantially planar. The coupling element 250 may comprise a grating coupler configured to diffract incident light such that at least some of the diffracted light couples into the waveguide 240. The grating coupler comprises a periodic pattern of parallel bars 255. The coupling element 250 may comprise silicon. The coupling element 250 may be formed from, for example, silicon nitrate. In the example of FIG. 2A, the monolithically integrated optical assembly 200 is formed on a substrate 205. The substrate 205 may be, for example, a silicon substrate. In the example of FIG. 2A, the monolithically integrated optical assembly 200 comprises a cladding structure 207 configured to envelop the coupling element 250 and the waveguide 240. The cladding structure 207 may comprise, for example, silicon dioxide. A distance 211 between the waveguide 240 and an upper surface 209 of the cladding structure 207 may be about 1 μm or more. The distance 211 between the waveguide 240 and the upper surface 209 of the cladding structure 207 may be about 10 μm or less. In the example of FIG. 2A, a distance 211 between the waveguide 240 and an upper surface 209 of the cladding structure 207 is about 5 μm.

The monolithically integrated optical assembly 200 comprises an optical element 210. The optical element 210 comprises a pattern of features 215 configured to control a propagation of light incident on the coupling element 250. The pattern of features 215 may comprise a substantially periodic pattern of features. The pattern of features 215 may comprise an aperiodic ordered pattern of features. The optical element 210 may be configured to control a direction in which light is transmitted and/or reflected by the optical element 210. The optical element 210 may be configured to control a focus of light that is transmitted and/or reflected by the optical element 210. The optical element 210 may be polarization insensitive. That is, the optical element 210 may not effect different polarizations of light in different ways. The optical element 210 may have any shape, e.g. generally circular, generally square, generally rectangular, etc. The dimensions (e.g. length, width or diameter) of the optical element 210 may be selected in at least partial dependence on a wavelength of light that is to be controlled by the optical element and/or materials of the optical assembly and/or a relative position of a light source (e.g. a VCSEL) that is to provide light to the optical assembly. The optical element 210 may comprise a dimension 213 (e.g. a length, width or diameter) of about 5 µm or more. The optical element 210 may comprise a dimension 213 (e.g. length, width or diameter) of about 20 µm or less. In the example of FIG. 2A, the optical element 210 is generally circular and has a diameter of about 20 µm. The optical element 210 may comprise silicon. The optical element 210 may be formed from, for example, amorphous silicon. In the example of FIG. 2A, the optical element 210 is located on the cladding structure 207. The optical element 210 may alternatively be located in the cladding structure 207.

Figure 2B:
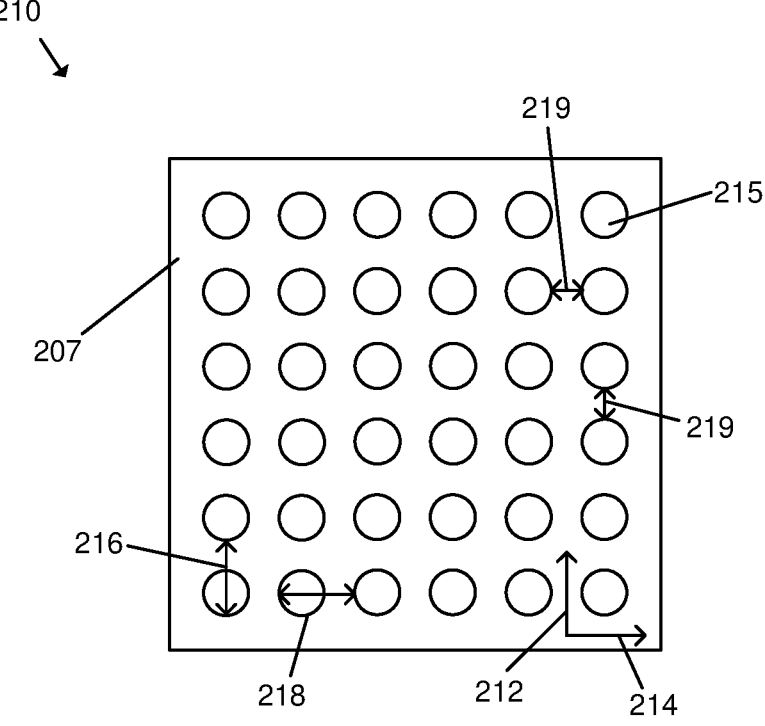
FIG. 2B schematically depicts a view from above a portion of the optical element of the monolithically integrated optical assembly of FIG. 2A.

FIG. 2B schematically depicts a view from above a portion of the optical element 210 of the monolithically integrated optical assembly of FIG. 2A. The pattern of features comprises an array of geometric features 215. In the example of FIG. 2B, the geometric features 215 are columns that extend from the cladding structure 207. Any shape of geometric feature 215 may be used. For example, the geometric features 215 may comprise slots (i.e. trenches within the cladding structure 207), dipoles, crosses, rings, split rings, etc. In the example of FIG. 2B, a cross-section of the geometric features is substantially circular. The geometric features 215 may have any cross-sectional shape. For example, a cross-section of the geometric features 215 may be substantially square, rectangular, triangular, etc. The array of geometric features 215 may form a lattice structure. In the example of FIG. 2B, the array of geometric features forms a substantially planar lattice structure comprising a grid array of columns 215. The array of geometric features 215 may comprise periodicity along first and second substantially orthogonal axes 212, 214 within a plane of the optical element 210. A first periodicity 216 of the pattern of features 215 along the first axis 212 may be substantially equal to a second periodicity 218 of the pattern of features 215 along the second axis 214. A distance 219 between adjacent features 215 along the first axis 212 and/or the second axis 214 may be substantially constant within the pattern.

The optical element 210 is configured to control a propagation of light incident on the coupling element. Dimensions (e.g. a height, length and/or width) of the features 215 and/or a periodicity 216, 218 of the pattern of features may be selected at least partially based on a wavelength of light that is to be controlled by the optical element 210. The dimensions of the features 215 and/or the periodicity 216, 218 of the pattern of features may be selected at least partially based on material properties (e.g. a refractive index) of parts of the optical assembly, such as the cladding structure 207 and the optical element 210. The dimensions of the features 215 and/or the periodicity 216, 218 of the pattern of features may be selected at least partially based on manufacturing process limitations (e.g. a critical dimension of a photolithographic process used to form the features). The dimensions of the features 215 and/or a periodicity 216, 218 of the pattern of features may be smaller than a wavelength of light that is to be controlled by the optical element 210. For example, the optical element 210 may be configured to control a propagation of (e.g. transmit and/or reflect in a controlled manner) infrared light. Infrared light may include light having a wavelength of about 800 nm or more. For example, the optical element 210 may be configured to control light having a wavelength of about 840 nm. As another example, the optical element 210 may be configured to control light having a wavelength of about 940 nm. As a further example, the optical element 210 may be configured to control light having a wavelength of about 1300 nm. The features 215 may have dimensions of about 50 nm or more. The features 215 may have dimensions of about 700 nm or less. The features 215 may have dimensions of about 500 nm or less. The periodicity 216, 218 of the pattern of features may be about 900 nm or less. The periodicity 216, 218 of the pattern of features may be about 800 nm or less. The periodicity 216, 218 of the pattern of features may be about 200 nm or more. These dimensions and periodicities may be suitable for controlling a propagation of infrared radiation. A substantially periodic pattern of features may have a periodicity that varies by less than about 30%. A substantially periodic pattern of features may have a periodicity that varies by less than about 10%. Features having dimensions that are less than about 1000 nm may be referred to as nano-features. For example, in the example of FIG. 2B, the features 215 may be referred to as nano-columns.

The optical element 210 may comprise a metamaterial. A metamaterial may be understood as being an artificially structured material comprising a pattern (e.g. substantially periodic or aperiodic ordered) of features having dimensions that are smaller than a wavelength of light that is to be controlled by the metamaterial. As such, the pattern of features may be a metamaterial. For example, the metamaterial may be a metalens. The pattern of features may form the subwavelength structures of the metalens. The metamaterial may be substantially planar. That is, the optical element 210 may comprise a metasurface. The pattern of features of the optical element 210 may form the subwavelength structures of the metasurface. For example, the metasurface may comprise a substantially planar metalens.

Figure 3A:
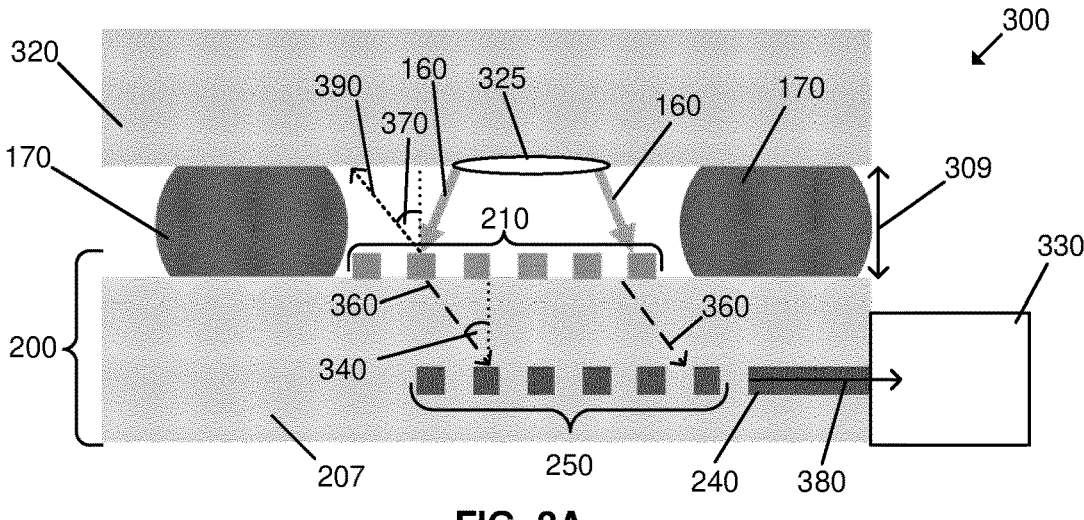
FIG. 3A schematically depicts a cross-sectional view from the side of a first optical system comprising a light source, the monolithically integrated optical assembly of FIG. 2A and a photonic integrated circuit in accordance with the present disclosure.

FIG. 3A schematically depicts a cross-sectional view from the side of a first optical system 300 comprising a light source 320, the monolithically integrated optical assembly 200 of FIG. 2A and a photonic integrated circuit 330. The light source 320 is configured to provide light 160 to the monolithically integrated optical assembly 200. The light source 320 may be attached to the monolithically integrated optical assembly 200 through soldering using solder balls 170. A distance 309 between the light source 320 and an upper surface 209 of a cladding structure 207 of the monolithically integrated optical assembly 200 may be selected at least partially based on a form factor and/r a topography of a light source (e.g. a VCSEL) configured to provide the optical assembly with light. In general, it may be desirable to reduce the distance 309 such that light loss through attenuation is reduced. The distance 309 between the light source 320 and an upper surface 209 of a cladding structure 207 of the monolithically integrated optical assembly 200 may be about 20 µm or more. The distance 309 between the light source 320 and the upper surface 209 of the cladding structure 207 of the monolithically integrated optical assembly 200 may be about 25 µm or less. The light source 320 may be configured to emit light 160 through an aperture 325 towards the monolithically integrated optical assembly 200. The aperture 325 may, for example, have a diameter of about 10 µm. The light source 320 may comprise, for example, a VCSEL, an LED, an edge-emitting laser (EEL), etc. In general, any light source suitable for incorporation into a monolithically integrated assembly (e.g. a wafer or chip) may be used. The light source 320 may be configured to produce infrared light. The light 160 is incident on the optical element 210 comprising a pattern of features. The optical element 210 is configured to control a propagation of light 360 incident on the coupling element 250. The coupling element 250 is configured to couple light 360 into the waveguide 240. The photonic integrated circuit 330 is configured to receive light 380 from the waveguide 240. The photonic integrated circuit 330 may be configured to use the light for signal processing purposes.

In the example of FIG. 3A, the optical element 210 is configured to control an angle 340 at which light 360 is incident on the coupling element 250. In the example of FIG. 3A, the optical element 210 is configured to introduce an oblique angle of incidence 340 of light 360 incident on the coupling element 250. The oblique angle of incidence 340 increases the amount of light 360 that couples into the waveguide 240 via the coupling grating 250, thereby increasing an optical efficiency of the first optical system 300. A geometry (e.g. a periodicity and/or dimensions) of the pattern of features of the optical element 210 may be selected at least partially based on a desired angle of incidence 340 of light 360 on the coupling grating 250. The desired angle of incidence 340 may be selected at least partially based on a geometry (e.g. a periodicity) of the coupling grating 250. For example, the coupling grating 250 may be designed such that a greatest coupling efficiency is achieved when light 360 is incident on the coupling grating 250 at an angle of about 8°. In this example, a geometry of the pattern of features of the optical element 210 may be designed such that the optical element 210 transmits light 360 toward the coupling element 250 at an angle of incidence of about 8°. The angle of incidence 340 at which the optical element 250 transmits light 360 toward the coupling element 250 may at least partially depend on a geometry of the pattern of features of the optical element 210 and a wavelength of the light 360. The optical element 210 may be configured to transmit light 360 toward the coupling element 250 at an angle of incidence of about 5° or more. The optical element 210 may be configured to transmit light 360 toward the coupling element 250 at an angle of incidence of about 10° or less.

The optical element 210 is configured to control a focus of light 360 incident on the coupling element 210. By focusing light 360 on to the coupling element 250, a greater amount of light 360 may be coupled into the waveguide 240 via the coupling element 240, thereby increasing an optical efficiency of the first optical system 300. The degree of focusing provided by the optical element 250 may at least partially depend on a geometry of the pattern of features of the optical element 210 and/or a wavelength of the light 360 that is to be controlled by the optical element 210.

The optical element 210 is configured to control an angle 370 at which light 390 reflects from the optical element 210. The optical element 210 may be configured to reflect at least some light 390 away from the aperture 325 of the light source 320 to avoid damaging the light source 320. The angle 370 at which the optical element 210 reflects light 390 may at least partially depend on a geometry of the pattern of features (e.g. dimensions of features and/or a periodicity of the pattern and/or a distribution of aperiodic order of the pattern) of the optical element 210 and a wavelength of the light 390. The angle 370 at which the optical element 210 reflects light 390 may be selected at least partially based on a position of the optical element 210 relative to the light source 320 and/or material properties (e.g. a refractive index) of the components (e.g. the cladding structure) of the optical system 300 and/or a form factor of the light source 320

Figure 3B:
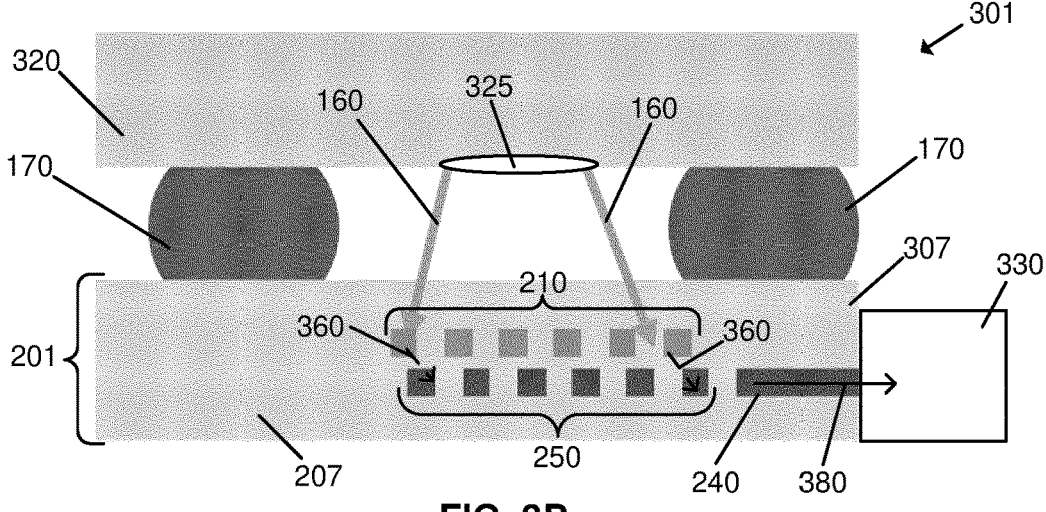
FIG. 3B schematically depicts a cross-sectional view from the side of a second optical system comprising a light source, a monolithically integrated optical assembly and a photonic integrated circuit in accordance with the present disclosure.
Figure 3C:
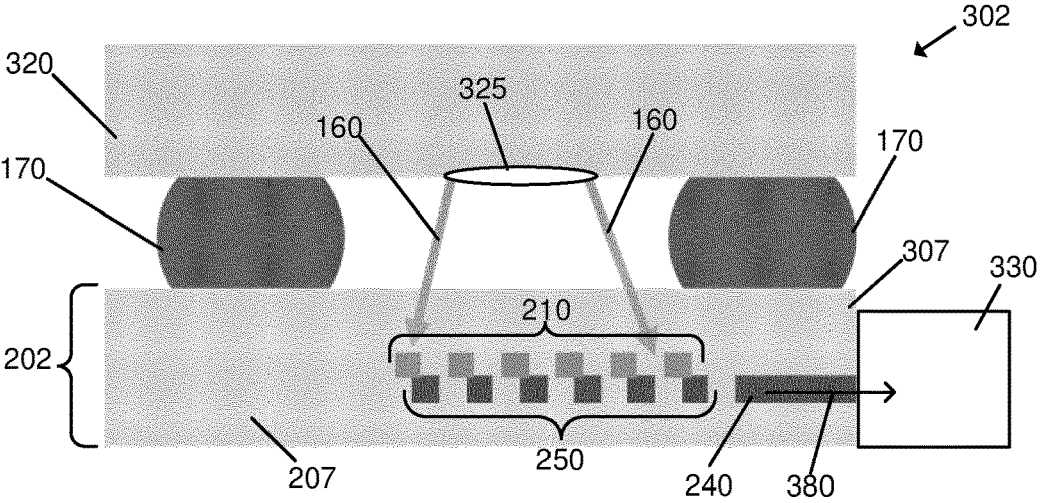
FIG. 3C schematically depicts a cross-sectional view from the side of a third optical system comprising a light source, a monolithically integrated optical assembly and a photonic integrated circuit in accordance with the present disclosure.

The monolithically integrated optical assembly 200 comprises a cladding structure 207 configured to envelop the coupling element 250 and the waveguide 240. In the example of FIG. 3A, the optical element 210 is located on the cladding structure 270. Alternative arrangements are possible. FIG. 3B schematically depicts a cross-sectional view from the side of a second optical system 301 comprising a light source 320, a monolithically integrated optical assembly 201 and a photonic integrated circuit 330. The structure and function of the components of the second optical system 301 are the same as that of the first optical system 300 except that the optical element 210 is located in the cladding structure 307. In the example of FIG. 3B, a gap exists between the optical element 210 and the coupling element 250. FIG. 3C schematically depicts a cross-sectional view from the side of a third optical system 302 comprising a light source 320, a monolithically integrated optical assembly 202 and a photonic integrated circuit 330. The structure and function of the components of the second optical system 302 are the same as that of the first and second optical systems 300, 301 except that the optical element 210 is located on the coupling element 250. In the example of FIG. 3C, no gap exists between the optical element 210 and the coupling element 250.

Figure 4A:
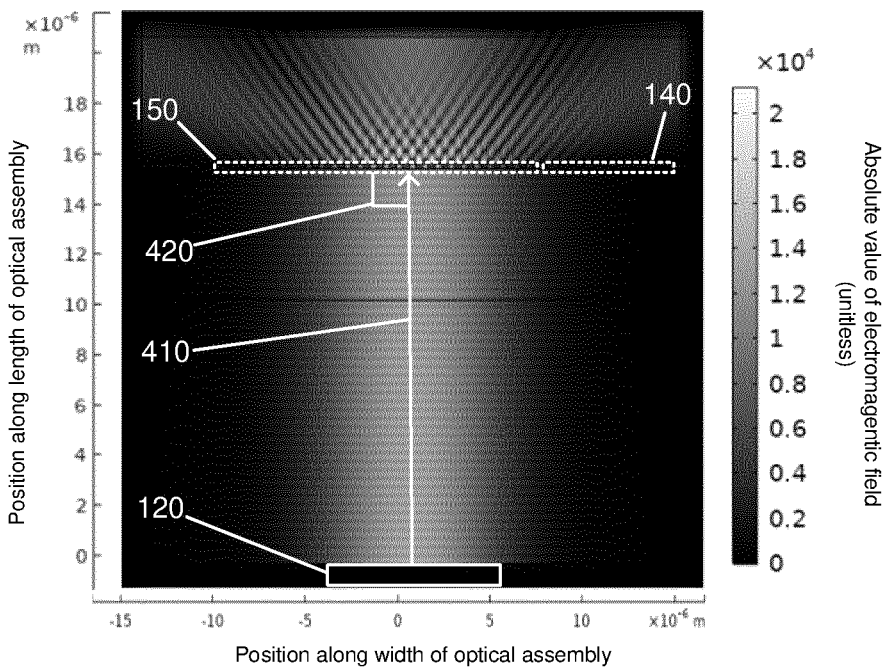
FIG. 4A shows a simulation of light coupling into a waveguide of a known optical assembly.

FIG. 4A shows a simulation of light coupling into a waveguide 140 of a known optical assembly. Light is emitted by a VCSEL 120 and travels through a cladding structure of the optical assembly before reaching a grating coupler 150. The grating coupler 150 diffracts the incident light such that at least some light couples into the waveguide 140. A direction of travel 410 of the light is substantially perpendicular to a normal of the grating coupler 150. That is, an angle 420 at which light is incident on the coupling grating 150 is about 90°. Some light is transmitted through the grating coupler 150 and does not couple into the waveguide 140.

Figure 4B:
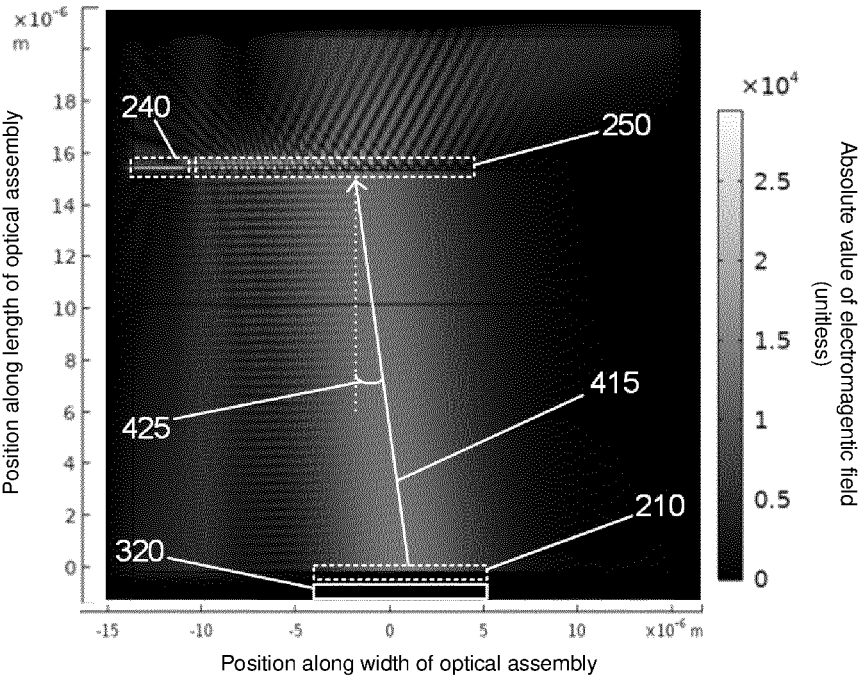
FIG. 4B shows a simulation of light coupling into a waveguide of a monolithically integrated optical assembly in accordance with the present disclosure.

FIG. 4B shows a simulation of light coupling into a waveguide 240 of a monolithically integrated optical assembly in accordance with the present disclosure. Light is emitted by a VCSEL 320 and is incident on an optical element 210 comprising a pattern of features. The optical element 210 is configured to control a propagation of light that is incident on a coupling element 250. The optical element 210 focuses the light and adjusts a direction of travel 415 of the light such that the light is incident on the coupling element 250 at an oblique angle 425. In the example of FIG. 4B, the coupling element 250 is configured to receive light at an angle of about 7°, and the optical element 210 is configured to transmit light towards the coupling element at an angle of incidence of about 7°. The coupling element 250 couples at least some of the incident light into the waveguide 240. A greater amount of light is coupled into the waveguide 240 and less light remains outside the waveguide 240 compared to the known optical assembly of FIG. 4A. As such, an optical efficiency of the optical assembly of FIG. 4B is greater than an optical efficiency of the known optical assembly of FIG. 4A.

Figure 5:
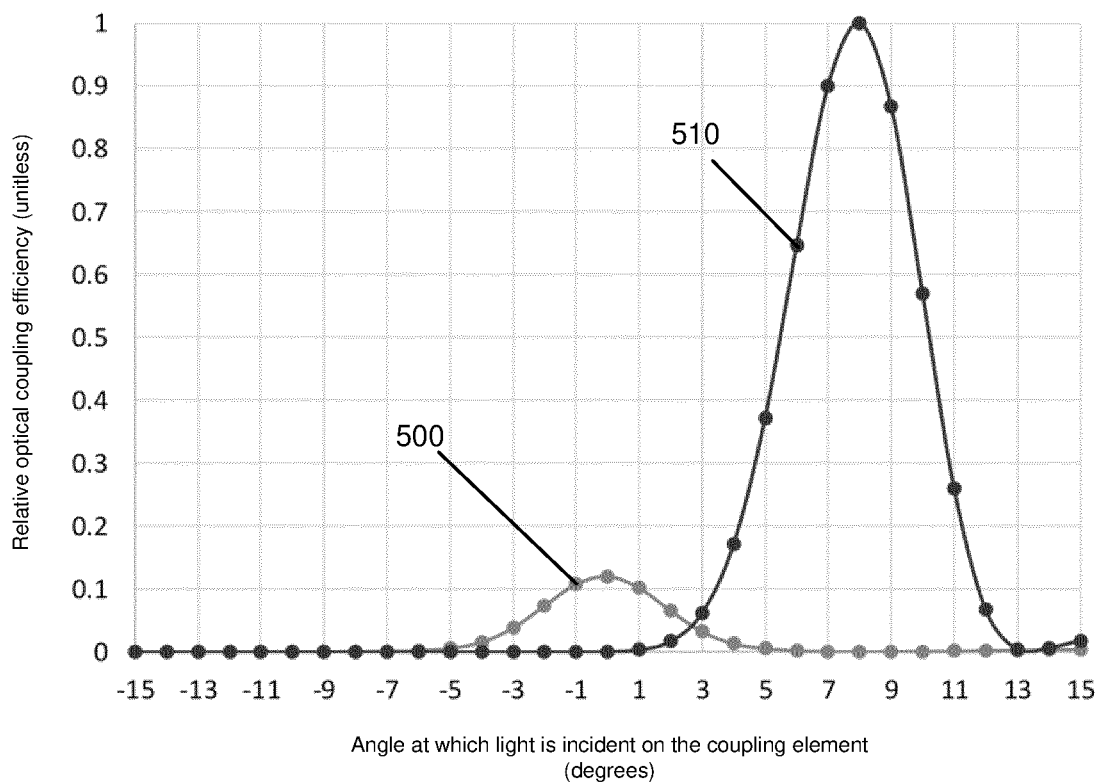
FIG. 5 is a graph comparing the coupling efficiency of the known optical assembly of FIG. 4A and the coupling efficiency of the monolithically integrated optical assembly of FIG. 4B.

FIG. 5 is a graph comparing the coupling efficiency 500 of the known optical assembly of FIG. 4A and the coupling efficiency 510 of the monolithically integrated optical assembly of FIG. 4B. The coupling efficiency 500 of the known optical assembly increases from 0% at an angle of incidence of about −5° to a maximum of about 12% at an angle of incidence of about 0° before decreasing back to 0% at an angle of incidence of about 5°. The coupling efficiency 510 of the monolithically integrated optical assembly increases from about 0% at an angle of incidence of about 1° to a maximum of about 100% at an angle of incidence of about 8° before decreasing back to 0% at an angle of incidence of about 13°. As is shown, the coupling efficiency 510 of the monolithically integrated optical assembly is about an order of magnitude greater than the coupling efficiency of the known optical assembly 500.

Figure 6:
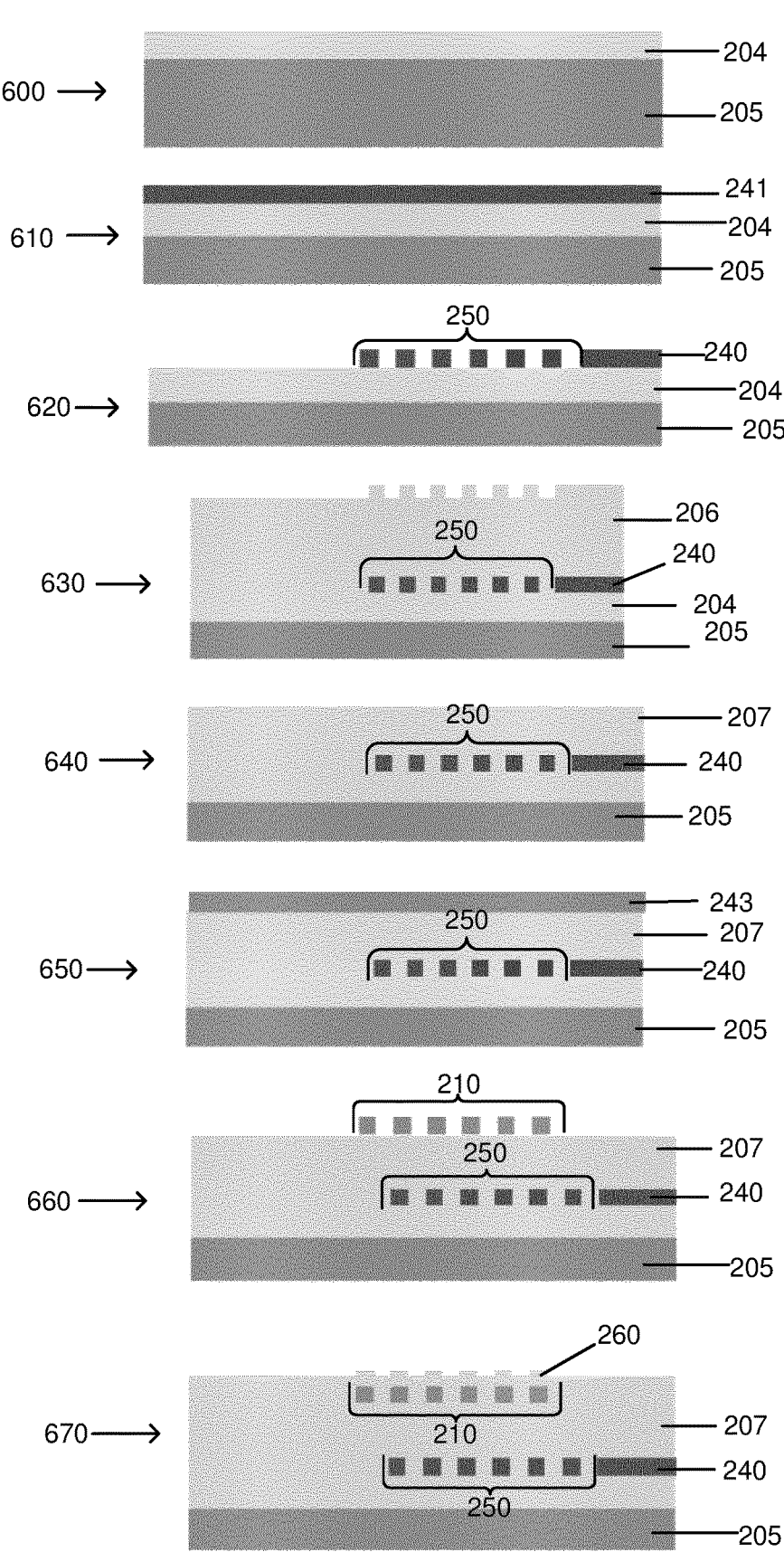
FIG. 6 shows examples of different stages of manufacture of a monolithically integrated optical assembly in accordance with the present disclosure.

FIG. 6 shows examples of different stages of manufacture of a monolithically integrated optical assembly in accordance with the present disclosure. A first stage 600 comprises forming a lower cladding layer 204 on a substrate 205. For example, the first stage 600 may comprise depositing (e.g. using thin film deposition or chemical vapour deposition) a layer of silicon dioxide 204 on a silicon substrate 205.

A second stage 610 comprises forming a first layer of material 241 on the lower cladding layer 204. For example, the second stage 610 may comprise depositing (e.g. using thin film deposition or chemical vapour deposition) a layer of silicon nitrate 241 on the layer of silicon dioxide 204. The first layer of material 240 may be referred to as a waveguide core.

A third stage 620 comprises patterning the first layer 241 to form a waveguide 240 and a coupling element 250 configured to couple light into the waveguide. For example, the third stage 620 may comprise using imprint lithography (e.g. nano-imprint lithography) or photolithography (e.g. extreme ultraviolet photolithography) and etching (e.g. chemically etching) the first layer of material to form a coupling grating 250 and a waveguide 240 configured to receive light from the coupling grating 250.

A fourth stage 630 comprises forming an upper cladding layer 206 on the coupling element 250 and waveguide 240. For example, the fourth stage 630 may comprise depositing (e.g. using thin film deposition or chemical vapour deposition) a layer of silicon dioxide 206 on the layer of silicon nitrate that forms the coupling element 250 and the waveguide 240.

A fifth stage 640 comprises levelling the upper cladding layer to form a cladding structure 207 configured to envelop the coupling element 250 and the waveguide 240. For example, the fifth stage 620 may comprise polishing (e.g. chemically polishing) the layer of silicon dioxide that forms the upper cladding layer to form a substantially flat upper surface of the cladding structure 207.

A sixth stage 650 comprises forming a second layer of material 243 on the upper surface of the cladding structure 207. For example, the sixth stage 650 may comprise depositing (e.g. using thin film deposition or chemical vapour deposition) a layer of amorphous silicon 243 on the upper surface of the cladding structure 207.

A seventh stage 660 comprises patterning the second layer of material 243 to form an optical element 210 comprising a pattern of features configured to control a propagation of light incident on the coupling element 250. For example, the seventh stage 660 may comprise using imprint lithography (e.g. nano-imprint lithography) or photolithography (e.g. extreme ultraviolet photolithography) and etching (e.g. chemical etching) the layer of amorphous silicon 243 to form the optical element 210 comprising a pattern of features configured to control a propagation of light incident on the coupling element 250. The second layer of material 243 may alternatively be formed elsewhere in the optical assembly (e.g. in the cladding structure 207 as shown in FIGS. 3B and 3C).

An optional eighth stage 670 may comprise forming a further cladding layer 260 on the optical element 210. For example, the optional eighth stage 670 may comprise depositing (e.g. using thin film deposition or chemical vapour deposition) a layer of silicon dioxide 260 on the cladding structure 207 and the optical element 210. The eighth stage 670 may be referred to as overcoating the optical element 210. Overcoating the optical element 210 may adjust optical properties (e.g. transmissivity, reflectivity, refractive index, etc.) of the optical assembly by introducing a further layer 260 through which light must propagate to reach the optical element 210 and coupling element 250.

FIG. 7 is a flowchart of a method of manufacturing a monolithically integrated optical assembly, and optionally an optical system, in accordance with the present disclosure. A first step 700 of the method comprises forming a first layer of material. Forming the first layer of material may comprise deposition (e.g. thin film deposition or chemical vapour deposition) of the first layer of material on the substrate. The substrate may be a silicon substrate. The first layer of material may comprise silicon nitrate.

A second step 710 of the method comprises patterning the first layer of material to form a waveguide and a coupling element configured to couple light into the waveguide. Patterning the first layer of material may comprise using imprint lithography. Patterning the first layer of material may comprise using photolithography. Patterning the first layer of material may comprise etching the first layer of material.

A third step 720 of the method comprises forming a second layer of material. Forming the second layer of material may comprise depositing (e.g. using chemical vapour deposition or thin film deposition) the second layer of material.

A fourth step 730 of the method comprises patterning the second layer of material to form an optical element comprising a pattern of features configured to control a propagation of light incident on the coupling element. Patterning the second layer of material may comprise using imprint lithography (e.g. nano-imprint lithography) or photolithography (e.g. extreme ultraviolet photolithography) to form the pattern of features. The pattern of features may be made from a material on a substrate using an additive process (i.e. adding material) and/or complementary features may be made using a reductive process (i.e. by removing material). The pattern of features could be fabricated either way (i.e. additive and/or reductive processes).

An optional fifth step 740 comprises attaching a light source configured to provide light to the optical element. Attaching the light source may comprise using a thermal process such as soldering and/or curing of an epoxy. Attaching the light source may comprise using an adhesive to attach the light source to the monolithically integrated optical element. The light source may be a VCSEL. The light source may be a flip-chip VCSEL. An optional sixth step 750 comprises arranging a photonic integrated circuit to receive light from the waveguide of the monolithically integrated optical assembly. The flowchart of FIG. 7 may additionally comprise one or more of the steps of the manufacturing process shown in FIG. 6 (e.g. formation of a cladding structure, overcoating the optical element, etc.).

Embodiments of the present disclosure can be employed in many different applications including photonic integrated circuits suitable for photonic and/or sensing applications, for example, in consumer devices such as portable and/or hand-held electronics, home appliances, automotive industry, telecommunications and other industries. For example, embodiments of the present disclosure may form part of an electro-optical device such as, for example, a sensor. The sensor may be, for example, an electronic nose, a particle sensor, a photonic sensor, etc. The electro-optical device may have a form factor suitable for use in a vehicle, such as a car.

The embodiments of the monolithically integrated optical assembly and embodiments of its manufacturing method shown in the figures represent exemplary embodiments, therefore they do not constitute a complete list of all embodiments according to the improved concept. Actual monolithically integrated optical assemblies may vary from the embodiments shown in terms of additional components, shape and configuration, for instance. In particular, features shown in the various figures may be combined with each other and hence form additional embodiments according to the improved concept.

LIST OF REFERENCE NUMERALS

100—known optical system
110—metalens
120—VCSEL
130—monolithically integrated optical assembly
140—waveguide
150—grating coupler
160—light
170—solder balls
180—reflected light
200—monolithically integrated optical assembly
240—waveguide
250—coupling element
255—periodic pattern of parallel bars
205—substrate
207—cladding structure
211—distance between the waveguide and an upper surface of the cladding structure
209—upper surface of the cladding structure
210—optical element
215—pattern of features
213—dimension of the optical element
212—first axis
214—second axis
216—first periodicity
218—second periodicity
219—distance between adjacent features along the first axis and/or the second axis
300—first optical system
320—light source
330—photonic integrated circuit
309—distance between the light source and an upper surface of a cladding structure
325—aperture
360—light incident on the coupling element
380—light received from the waveguide
340—angle at which light is incident on the coupling element
370—angle at which light reflects from the optical element
390—light reflected by the optical element
301—second optical system
201—monolithically integrated optical assembly
307—cladding structure
302—third optical system
202—monolithically integrated optical assembly
410—direction of travel of light
420—angle at which light is incident on the coupling grating 415—direction of travel of light
425—oblique angle of incidence
500—coupling efficiency of the known optical assembly of FIG. 4A
510—coupling efficiency of the monolithically integrated optical assembly of FIG. 4B.
600—first stage of manufacture
204—lower cladding layer
610—second stage of manufacture
241—first layer of material
620—third stage of manufacture
630—fourth stage of manufacture
206—upper cladding layer
640—fifth stage of manufacture
650—sixth stage of manufacture
243—second layer of material
660—seventh stage of manufacture
670—eighth stage of manufacture
260—further cladding layer
700—first step of method of manufacture
710—second step of method of manufacture
720—third step of method of manufacture
730—fourth step of method of manufacture
740—fifth step of method of manufacture
750—sixth step of method of manufacture The skilled person will understand that in the preceding description and appended claims, positional terms such as 'above', 'along', 'side', etc. are made with reference to conceptual illustrations, such as those shown in the appended drawings. These terms are used for ease of reference but are not intended to be of limiting nature. These terms are therefore to be understood as referring to an object when in an orientation as shown in the accompanying drawings.

Although the disclosure has been described in terms of embodiments as set forth above, it should be understood that these embodiments are illustrative only and that the claims are not limited to those embodiments. Those skilled in the art will be able to make modifications and alternatives in view of the disclosure that are contemplated as falling within the scope of the appended claims. Each feature disclosed or illustrated in the present specification may be incorporated in any embodiments, whether alone or in any appropriate combination with any other feature disclosed or illustrated herein.

What is claimed is:

1. A monolithically integrated optical assembly comprising:
   a waveguide configured to receive light;
   a coupling element configured to couple light into the waveguide; and
   an optical element comprising a pattern of features configured to control a propagation of light incident on the coupling element,
   wherein the optical element is configured to control an angle at which light is incident on the coupling element and wherein the optical element is configured to control a focus of light incident on the coupling element,
   wherein the optical element is configured to direct light toward the coupling element at an angle of incidence of 10° or less,
   wherein the optical element is disposed over the coupling element so as to overlap only a portion of the coupling element.

2. The monolithically integrated optical assembly of claim 1, wherein the optical element is configured to control an angle at which light reflects from the optical element.

3. The monolithically integrated optical assembly of claim 1, further comprising a cladding structure configured to envelop the coupling element and the waveguide, wherein the optical element is located on the cladding structure or in the cladding structure.

4. The monolithically integrated optical assembly of claim 1, wherein the pattern of features comprises an array of geometric features.

5. The monolithically integrated optical assembly of claim 4, wherein the array of geometric features is polarization insensitive.

6. The monolithically integrated optical assembly of claim 1, wherein the optical element comprises a metamaterial.

7. The monolithically integrated optical assembly of claim 1, wherein the optical element comprises a metasurface.

8. An optical system comprising:
the monolithically integrated optical assembly of claim 1; and,
a photonic integrated circuit configured to receive light from the waveguide.

9. An optical system comprising:
the monolithically integrated optical assembly of claim 1; and,
a light source configured to provide light to the monolithically integrated optical assembly.

10. The optical system of claim 9, wherein the optical element is configured to receive light directly from the light source and to reflect at least some light away from the light source.

11. An electronic device comprising the monolithically integrated optical assembly of claim 1.

12. A method of manufacturing a monolithically integrated optical assembly comprising:
forming a first layer of material;
patterning the first layer of material to form a waveguide and a coupling element configured to couple light into the waveguide;
forming a second layer of material; and, patterning the second layer of material to form an optical element comprising a pattern of features configured to control a propagation of light incident on the coupling element, wherein the optical element is configured to control an angle at which light is incident on the coupling element and wherein the optical element is configured to control a focus of light incident on the coupling element,
wherein the optical element is configured to direct light toward the coupling element at an angle of incidence of 10° or less,
wherein the optical element is disposed over the coupling element so as to overlap only a portion of the coupling element.

13. The method of claim 12, wherein forming the second layer of material comprises depositing the second layer of material.

14. The method of claim 12, wherein patterning the second layer of material comprises using imprint lithography or photolithography to form the pattern of features.

15. The method of claim 12, comprising overcoating the optical element.

16. A method of manufacturing an optical system comprising arranging a photonic integrated circuit to receive light from the waveguide of the monolithically integrated optical assembly of claim 1.

17. A method of manufacturing an optical system comprising attaching a light source to the monolithically integrated optical assembly of claim 1.

18. The monolithically integrated optical assembly of claim 1, wherein the angle of incidence is 5° or more.

19. The monolithically integrated optical assembly of claim 3, wherein the optical element is disposed in the cladding structure and directly contacting the coupling element.

20. The monolithically integrated optical assembly of claim 4, wherein the array of geometric features comprises a nano-columnar structure.

* * * * *